May 29, 1923.

W. S. ELLIOTT

WATER HEATING AND DEGASIFYING APPARATUS

Original Filed March 31, 1915   2 Sheets-Sheet 1

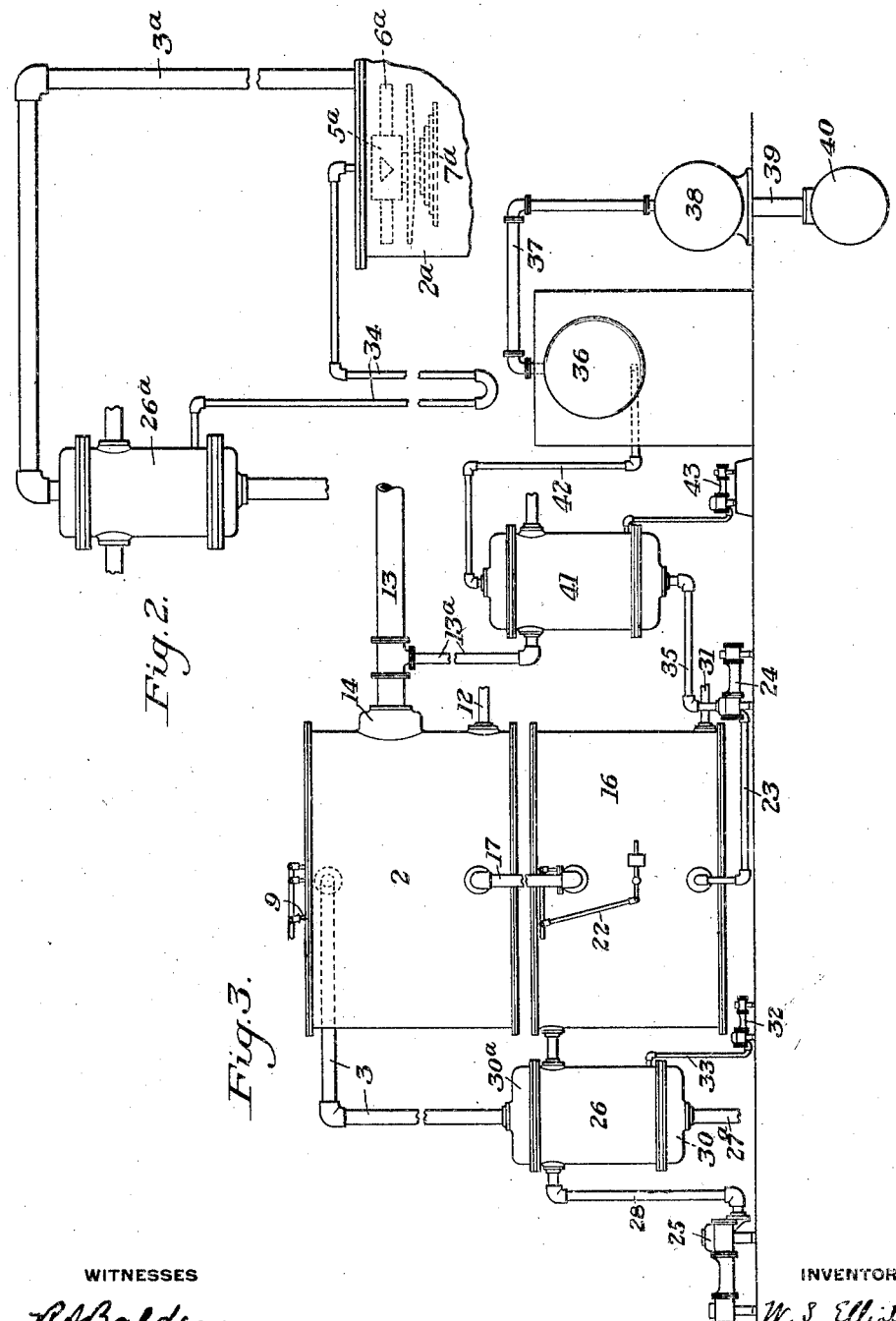

Patented May 29, 1923.

1,457,153

UNITED STATES PATENT OFFICE.

WILLIAM S. ELLIOTT, OF PITTSBURGH, PENNSYLVANIA.

WATER HEATING AND DEGASIFYING APPARATUS.

Original application filed March 31, 1915, Serial No. 18,268. Divided and this application filed March 29, 1917. Serial No. 158,238.

*To all whom it may concern:*

Be it known that I, WILLIAM S. ELLIOTT, a citizen of the United States, residing at Pittsburgh, Allegheny County, Pennsylvania, have invented a new and useful Improvement in Water Heating and Degasifying Apparatus, of which the following is a full, clear, and exact description, reference being had to the accompanying drawings, forming part of this specification, in which—

Figure 2 is a diagram of a portion of the apparatus, showing a modification, and Figure 3 is a diagram showing one form of a complete system for using the treated liquid.

Figure 1:
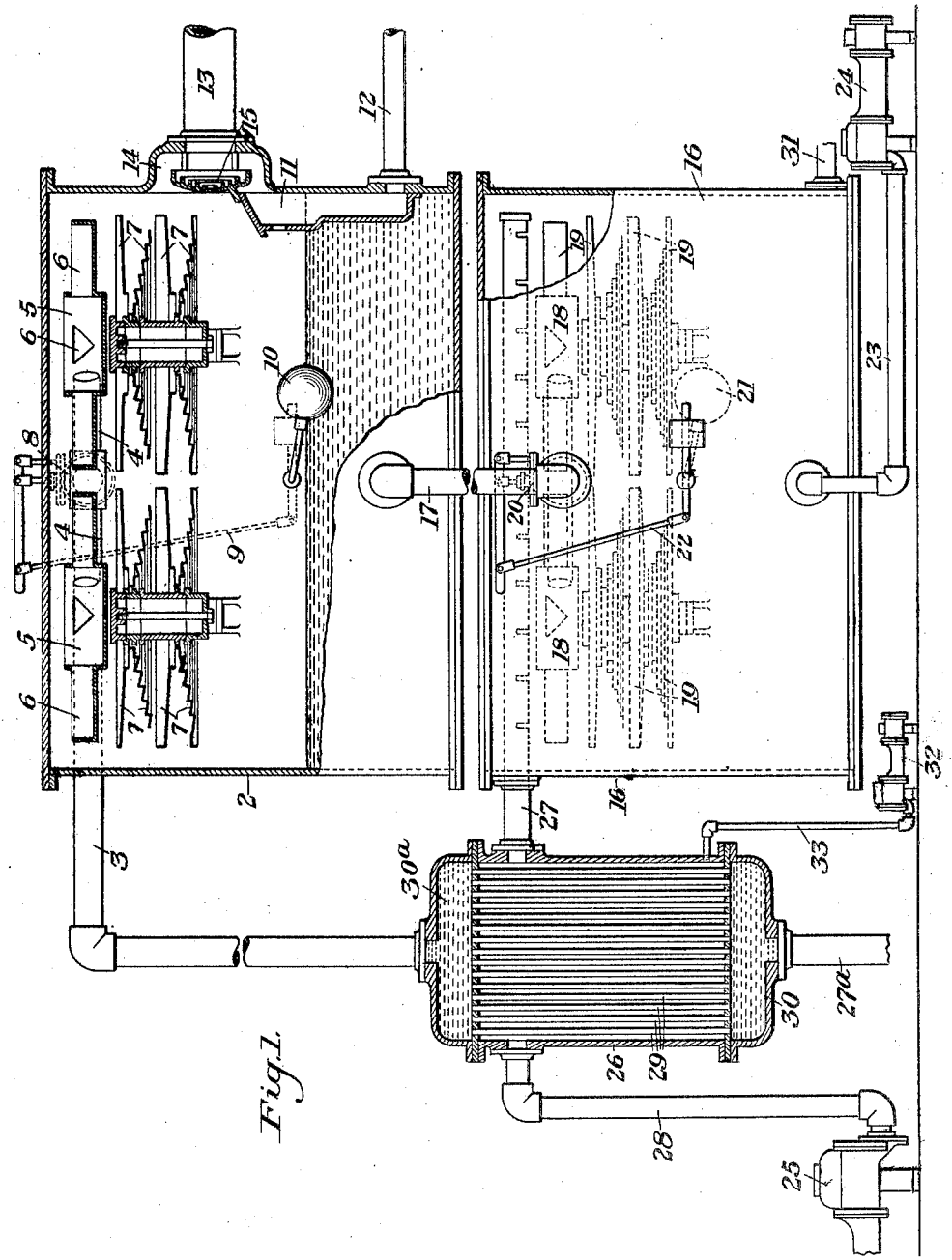
Figure 1 is a view partly in side elevation and partly in section, and largely diagrammatic, of one form of apparatus for treating the feed water.

My invention has more particular relation to a steam generating system, although portions of the apparatus embodying the invention may be used for other purposes.

One object of my invention is to provide apparatus of novel and efficient character whereby the feed water used for the generation of steam may be freed to a maximum degree from the air and other gases contained or dissolved therein. It is a well known fact that the air and other gases contained in steam and water causes boiler corrosion, and also corrosion of the valves, pipes, fittings, and other metal parts with which the water or steam come in contact.

In carrying out my invention, the feed water or other liquid to be treated is admitted into the receiver, preferably at a relatively high temperature. A sufficient degree of vacuum is maintained in the receiver so that the liquid on entering the receiver is caused to have a violent ebullition of flashing action. This causes the liquid to be thoroughly broken up, whereby the contained air and other gases can be very effectively extracted by the vacuum action. The liquid is then preferably caused to flow downwardly through the receiver in a distributed or film-like condition so that during its passage all portions thereof are subjected to the vacuum action. The result is a very complete separation of the air and other gases. The pressure and consequently the temperature in the receiver is lowered by any suitable means, such as a vacuum pump connected thereto. A condenser is preferably interposed between the vacuum pump and the receiver for condensing such hot vapors as are condensable before they reach the pump. The heat given up in this condenser may be used for the preliminary or partial heating of the liquid to be treated.

Inasmuch as the temperature of the water is lowered in the receiver by the action just described, I find it advisable before utilizing this water in the boiler or generator to pass it through a reheater.

The nature of my invention will be better understood by reference to the accompanying drawings in which I have illustrated one form of apparatus for carrying out the invention, and which will now be described, it being premised, however, that the particular apparatus shown is illustrative only and that the invention is capable of various other embodiments within the scope of the appended claims.

In these drawings the numeral 2 designates a suitable heating tank or receptacle into which the liquid to be treated is conducted by means of the supply pipe 3. This pipe is shown as entering the upper portion of the heater at the central portion thereof, and is branched as indicated at 4, these branches supplying the spray pans 5. These pans are shown as having overflow or spray troughs 6 which discharge onto a suitable arrangement of distributors 7. Pipe 3 is provided with a control valve 8 having actuating connections 9 with a float 10 within the heater whereby a substantially constant level of the water is maintained. 11 designates an overflow chamber within the heater and 12 a discharge pipe therefor. This chamber 11 not only takes care of any overflow which may occur in case the level should for any reason rise beyond its normal, but it also takes care of the entrainment from the steam supply pipe 13. The latter opens into an off-set portion 14 of the heater 2 and is arranged to discharge against a separator plate 15, the drip from which falls into the chamber 11. The purpose of the separator 15 is to separate out any oil which may be entrained with the steam in pipe 13. The steam delivered by this pipe is employed for the purpose of heating the water in the tank, although any other heating means may be employed.

16 designates a receiver which is connected by a pipe 17 with the discharge of the heater 2 and which constitutes an evaporing chamber. The pipe enters the upper portion of the receiver and the latter is provided with spray pans 18 and distributors 19 similar to those in the heater. Any other suitable means may, however, be provided for receiving the water as it enters the receiver. 20 is a control valve for the pipe 17, and 21 is a control float therefor. 22 is the actuating connection between the float and the valve. 23 is an offtake pipe for the treated water leading to a pump 24.

The receiver 16 is connected with a vacuum pump 25 through a condenser 26 by means of the pipes 27 and 28. The condenser 26 has a water supply connection at 27ª discharging into the bottom chamber 30, a bank of heating tubes 29 connecting this chamber 30 with an upper chamber 30ª. The pipe 3 is connected to the outlet of this chamber 30ª. 31 is a sediment discharge or clean-out connection for the receiver.

The operation is as follows: Water entering the condenser 26 from the pipe 27ª passes upwardly through the tubes 29 to the chamber 30ª, and thence into the heater 2 by way of the pipe 3. It is brought to the desired temperature in this heater and is then discharged into the receiver having a pressure and temperature lower than that of the heater, or the receiver may be one in which a partial vacuum is maintained by the action of the pump 25. The effect of this vacuum upon the water entering the receiver is to cause it to boil since the pressure in the receiver is lower than the pressure corresponding to the temperature of the liquid immediately before it enters the receiver. By maintaining a lower pressure or a sufficient degree of vacuum in this receiver the water entering it is immediately subjected to a violent boiling action and a part of it is rapidly converted into vapor. The water vapor and other gases thus liberated by the boiling are drawn off through the condenser 26 by the action of the pump 25; and in passing over the bank of tubes 29 impart a very considerable degree of heat to the water contained in said tubes before it enters the heater 2. At the same time, by reason of the cooling action of the water in the pipes 29 a large percentage of the condensable vapors are condensed, and the liquid of condensation is drawn off by the action of a suitable pump 32 through the pipe 33, or otherwise disposed of. For instance, instead of the pump 32, I may (as shown in Figure 2) elevate the condenser, as indicated at 26ª to a height above the heater 2ª such as to create a head of water in the U-shaped tube 34 leading into the heater 2ª sufficient to discharge the water from the condenser into the heater, against the action of the vacuum in the condenser.

In Figure 3 I have shown diagrammatically an arrangement of boiler, turbine and condenser apparatus for utilizing the treated water. In this apparatus the pump 24, before referred to, delivers the purified water through the pipe 35 into a boiler 36. The steam generated in this boiler is conducted by the pipe 37 to the turbine 38 or to any other steam-using appliance. The exhaust of this turbine or other appliance is connected by the pipe 39 with a condenser 40, which may be of any well known type.

41 designates a reheater through which the water discharged from the receiver by the pump 24 preferably passes on its way to the boiler or generator 36. This heater may be of any suitable or well known character. As shown, it is of the same construction as the condenser 26, before described, the water being forced upwardly through the bank of heating tubes by the pump 24; while steam is circulated around said tubes. This steam may be supplied from any suitable source, as by a branch 13ª from the pipe 13 which supplies the heater 2. The outlet of the reheater 41 is connected by a pipe 42 with a boiler or generator 36. 43 is a pump by means of which the water of condensation may be withdrawn from the steam chamber of the reheater 41.

While the employment of the reheater requires the use of additional steam, yet this use is largely offset by the fact that a very considerable percentage of the heat lost in the receiver 16 has previously been utilized in the condenser 26 in preheating the feed water.

On account of the removal of the air from the water in the manner described, the steam reaches the condenser 40 in a condition practically free from air, provided there is no leakage in the pipe line between the condenser and turbine.

With the old condensers employing a large dry pump, all of the air and other gases must be extracted by the use of very large vacuum air pumps, working against a high vacuum. By the employment of my system, the dry pump at the main condenser need be only of a small percent of the capacity of that heretofore required, as a large percentage of the air has already been removed from the liquid at a vacuum pressure which is but a small percentage of that employed in the main condenser. This results in great economy in the operation of the system. In actual operation I have found that under economical commercial operating conditions my invention will effect a separation of ninety to ninety-eight percent of the contained air and gases. These figures apply to substantially all simple gases which are found dissolved in natural air as a mixture or constituent of a mixture, with the exception of carbon dioxide. The latter is separated to as complete an extent as boiling it for a limited time is able to accomplish.

My invention also reduces all soluble carbonates dissolved in the liquid in the form of bicarbonates from the state of solubility to that of insolubility.

A further advantage of my invention is, that in its employment the slight heat losses which occur are more than recovered by the gain in the relative power required to operate the large vacuum pumps heretofore required in the operation of condensers, to say nothing of the gain due to the increased vacuum in the condensers.

It will be readily understood that the form of the various apparatus described can be widely varied, and that any suitable form of heater and receiver can be used. Where the water to be treated is already at the proper temperature the heater 2 may be entirely omitted and the water conducted directly to the receiver, and various other changes can be made.

The present application is a division of my pending application, Serial No. 18,268, filed March 31, 1915; and is also a continuation in part of my application Serial No. 93,625, filed April 26, 1916.

I claim:

1. In apparatus for deaerating liquid, a receiver having a liquid space and a steam space, a service connection leading from the liquid space of said receiver to convey substantially air-free liquid therefrom to a point of utilization of such liquid, automatic means for supplying to said receiver substantially wholly in accord with the demands of said service connection liquid which is at a temperature higher than the temperature in said receiver and which has a substantially constant difference in temperature thereover, and means connected to said receiver for maintaining said substantially constant difference in temperature.

2. In apparatus for deaerating liquid, a receiver having a liquid space and a steam space, a service connection leading from the liquid space of said receiver to convey substantially air-free liquid therefrom to a point of utilization of such liquid, automatic means for supplying to said receiver substantially wholly in accord with the demands of said service connection liquid which is at a temperature higher than the temperature in said receiver and which has a substantially constant difference in temperature thereover, and a condenser connected to said receiver for maintaining said substantially constant difference in temperature.

3. In apparatus for deaerating liquid, a receiver having a liquid space and a steam space, a service connection leading from the liquid space of said receiver to convey substantially air-free liquid therefrom to a point of utilization of such liquid, automatic means for supplying to said receiver substantially wholly in accord with the demands of said service connection liquid which is at a temperature higher than the temperature in said receiver and which has a substantially constant difference in temperature thereover, and means adapted to recover the heat released in said receiver, said last mentioned means maintaining said substantially constant difference in temperature.

4. In apparatus for deaerating liquid, a receiver having a liquid space and a steam space, a service connection leading from the liquid space of said receiver to convey substantially air-free liquid therefrom to a point of utilization of such liquid in a practically continuous manner, automatic means for supplying to said receiver substantially wholly in accord with the demands of said service connection liquid and heat and for feeding the entering liquid through the atmosphere in steam space of the receiver, and means connected to said receiver for withdrawing air and vapor therefrom, the parts of said deaerating apparatus being correlated and arranged to maintain temperature and pressure conditions in the receiver to cause the liquid to release substantially all of its contained air.

5. In apparatus for deaerating liquid, a receiver having a liquid space and a steam space, a service connection leading from the liquid space of said receiver to convey substantially air-free liquid therefrom to a point of utilization of such liquid, automatic means for supplying to said receiver substantially wholly in accord with the demands of said service connection liquid and heat and for feeding the entering liquid through the atmosphere in the steam space of said receiver, and means including a condenser, connected to said receiver for withdrawing air and vapor therefrom, the parts of said deaerating apparatus being correlated and arranged to maintain temperature and pressure conditions in the receiver to cause the liquid to release substantially all of its contained air.

6. In apparatus for deaerating liquid, a receiver having a liquid space and a steam space, a service connection leading from the liquid space of said receiver to convey substantially air-free liquid therefrom to a point of utilization of such liquid in a practically continuous manner, automatic means for supplying to said receiver substantially wholly in accord with the demands of said service connection liquid and heat and for feeding the entering liquid through the atmosphere in the steam space of said receiver, and means including a condenser connected to said receiver for withdrawing air and vapor therefrom, the parts of said deaerating apparatus being correlated and arranged to maintain temperature and pressure conditions in the receiver to cause the liquid to release substantially all of its contained air, said condenser operating to recover the heat of the vapor released in said receiver.

7. In apparatus for deaerating liquid, a receiver having a liquid space and a steam space, a service connection leading from the liquid space of said receiver to convey in a practically continuous manner substantially air-free liquid therefrom to a point of utilization of such liquid, means for supplying liquid to the receiver and passing the liquid in a divided state through the steam space of the receiver, the liquid feeding means operating substantially wholly in accord with the demands of said service connection, and means for positively withdrawing air and vapor from the receiver and discharging the uncondensed portion thereof, the receiver being closed against inlet of free air, the parts of said deaerating apparatus being correlated and arranged to maintain temperature and pressure conditions in the receiver to cause the liquid to release substantially all its dissolved air.

8. In apparatus for deaerating liquid, the combination with a condenser, through which the liquid to be deaerated flows, a heater, a receiver in which the air contained in the liquid is continuously released from the liquid, and connections arranged to pass all of the liquid, which flows through the condenser, through the heater and the receiver in the order named, of a service connection conveying substantially air-free liquid from the receiver to a point of utilization of such liquid, and means for controlling the rate of feed to the receiver substantially wholly in accordance with the demands of said service connection.

9. In apparatus for deaerating liquid, a receiver having a liquid space and a steam space, a service connection leading from the liquid space of said receiver to convey in a continuous manner substantially air-free liquid therefrom to a point of utilization of such liquid, means for supplying liquid to the receiver and passing the liquid in a divided state through the steam space of the receiver, the liquid feeding means operating substantially wholly in accord with the demands of said service connection, a heat interchanger connected to the steam space of the receiver and arranged to withdraw air and vapor therefrom, and means for withdrawing air from the heat interchanger, the receiver being closed against inlet of free air, the parts of said deaerating apparatus being correlated and arranged to maintain temperature and pressure conditions in the receiver to cause the liquid to release substantially all its dissolved air.

10. A receiver having an air outlet, means for feeding liquid thereto in a continuous manner, means for supplying heat to an amount to change the phase of said liquid to a percentage sufficient to release substantially all of the air contained therein, means for recovering at least portion of the heat released in the receiver, a pipe system arranged to use substantially air free water, and a closed conduit connecting the receiver to said system to convey substantially air-free water from the receiver to a point of utilization of such liquid in a continuous manner.

11. In apparatus for deaerating liquid, a receiver having a liquid space and a steam space, a service connection leading from the liquid space of said receiver to convey substantially air-free liquid therefrom to a point of utilization of such liquid in a practically continuous manner, automatic means for supplying to said receiver substantially wholly in accord with the demands of said service connection liquid and heat and for feeding the entering liquid through the atmosphere in steam space of the receiver, and means connected to said receiver for continuously withdrawing air and vapor therefrom, the parts of said deaerating apparatus being correlated and arranged to maintain temperature and pressure conditions in the receiver to cause the liquid to release substantially all of its contained air.

12. In apparatus for deaerating liquid, a receiver having a liquid space and a steam space, a service connection leading from the liquid space of said receiver to convey substantially air-free liquid therefrom to a point of utilization of such liquid in a practically continuous manner, automatic means for supplying to said receiver substantially wholly in accord with the demands of said service connection liquid and heat and for feeding the entering liquid through the atmosphere in steam space of the receiver, and means including a surface condenser connected to said receiver for withdrawing the air and vapor therefrom, the cooling liquid for said condenser being subsequently passed to the receiver, the parts of said deaerating apparatus being correlated and arranged to maintain temperature and pressure conditions in the receiver to cause the liquid to release substantially all of its contained air.

13. In apparatus for deaerating liquid, a receiver having a liquid space and a steam space, a service connection leading from the liquid space of said receiver to convey substantially air-free liquid therefrom to a point of utilization of such liquid in a practically continuous manner, automatic means for supplying to said receiver substantially wholly in accord with the demands of said service connection liquid and heat and for feeding the entering liquid through the atmosphere in steam space of the receiver, including a condenser, through which liquid supplied to the apparatus passes and connected to said receiver for withdrawing air and vapor therefrom and preventing it from contaminating the cooling liquid passing through the condenser, the parts of said deaerating apparatus being correlated and arranged to maintain temperature and pressure conditions in the receiver to cause the liquid to release substantially all of its contained air.

In testimony whereof I have hereunto set my hand.

WILLIAM S. ELLIOTT.

Witnesses:
J. T. MATTERN,
HUGO BERGQUIST.